US012782630B2

(12) United States Patent
Lipson et al.

(10) Patent No.: US 12,782,630 B2
(45) Date of Patent: Nov. 3, 2026

(54) MICROMACHINED WAVEGUIDE AND METHODS OF MAKING AND USING

(71) Applicant: The Trustees of Columbia University in the City of New York, New York, NY (US)

(72) Inventors: Michal Lipson, New York, NY (US); Mohammad Amin Tadayon, Bronx, NY (US)

( * ) Notice: Subject to any disclaimer, the term of this patent is extended or adjusted under 35 U.S.C. 154(b) by 645 days.

(21) Appl. No.: 17/055,465

(22) PCT Filed: May 14, 2019

(86) PCT No.: PCT/US2019/032218

§ 371 (c)(1),
(2) Date: Nov. 13, 2020

(87) PCT Pub. No.: WO2019/222215

PCT Pub. Date: Nov. 21, 2019

(65) Prior Publication Data

US 2021/0191036 A1 Jun. 24, 2021

Related U.S. Application Data

(60) Provisional application No. 62/670,983, filed on May 14, 2018.

(51) Int. Cl.
*G02B 6/02* (2006.01)
*B29D 11/00* (2006.01)
*B33Y 80/00* (2015.01)

(52) U.S. Cl.
CPC .... *G02B 6/02052* (2013.01); *B29D 11/00663* (2013.01); *B33Y 80/00* (2014.12)

(58) Field of Classification Search
CPC ................ G02B 6/02052; B33Y 80/00; B29D 11/00663
See application file for complete search history.

(56) References Cited

U.S. PATENT DOCUMENTS 3,759,590 A * 9/1973 Arnaud .................... G02B 6/10 359/619
4,662,728 A * 5/1987 Whitehead .............. G02B 6/10 359/435

(Continued)

FOREIGN PATENT DOCUMENTS

WO 2017/149423 A1 9/2017

OTHER PUBLICATIONS

Andrea et al., "EFRI NewLAW: New frontiers for topologically-protected propagation of light, sound, elastic and mechanical waves," NSF Award#: Aug. 15, 2016, 1641069.

(Continued)

*Primary Examiner* — Tina Wong
(74) *Attorney, Agent, or Firm* — GIBRALTAR CONSULTING LLC; Tariq Najee-Ullah

(57) ABSTRACT

An optical apparatus comprises a waveguide and a plurality of optical components disposed in the waveguide. The optical components disposed in the waveguide direct light rays indicative of an image through at least a portion of the waveguide. The optical components can be configured to preserve a wave front of the represented image. In various embodiments, the optical elements are at least one of lenses, mirrors, and filters. Various methods of making and using the optical apparatus are disclosed herein.

24 Claims, 13 Drawing Sheets

(56) References Cited

U.S. PATENT DOCUMENTS

| | | | | | |
|---|---|---|---|---|---|
| 5,208,885 | A | | 5/1993 | Dragone et al. | |
| 5,298,366 | A | | 3/1994 | Iwasaki et al. | |
| 5,557,701 | A | * | 9/1996 | Krivoshlykov | G02B 6/0288 385/38 |
| 5,943,463 | A | | 8/1999 | Unuma et al. | |
| 6,294,775 | B1 | | 9/2001 | Seibel et al. | |
| 6,453,090 | B1 | | 9/2002 | Conde et al. | |
| 6,847,770 | B2 | * | 1/2005 | Kittaka | C03C 25/601 385/124 |
| 6,856,712 | B2 | | 2/2005 | Fauver et al. | |
| 8,189,263 | B1 | | 5/2012 | Wang et al. | |
| 8,743,464 | B1 | | 6/2014 | Amirparviz | |
| 10,690,916 | B2 | * | 6/2020 | Popovich | G02B 6/0035 |
| 2003/0083552 | A1 | | 5/2003 | Remijan et al. | |
| 2008/0282741 | A1 | | 11/2008 | Shimizu et al. | |
| 2010/0286476 | A1 | | 11/2010 | Jiang et al. | |
| 2011/0296726 | A1 | * | 12/2011 | Rinko | G02B 6/42 156/219 |
| 2015/0234476 | A1 | | 8/2015 | Schowengerdt et al. | |
| 2016/0313491 | A1 | * | 10/2016 | Li | G02B 6/0068 |
| 2017/0351026 | A1 | | 12/2017 | Lipson et al. | |
| 2018/0011324 | A1 | * | 1/2018 | Popovich | G02B 6/0076 |
| 2018/0177404 | A1 | * | 6/2018 | Liu | A61B 5/0084 |

OTHER PUBLICATIONS

Fain et al., "Photonic Needles for Light Delivery in Deep Tissue-like Media," Nature Scientific Reports, Feb. 2017, vol. 7, Issue 1, Article 5627.

Flusberg et al., "Fiber-optic fluorescence imaging," Nature methods, 2005, vol. 2, No. 12, pp. 941-950.

Ismail et al., "Polymer microlenses for collimating light from single-mode silicon oxynitride optical waveguides," 16th European Conference on Integrated Optics, ECIO, Apr. 2012, Paper 188.

Li et al., "Deep Tissue Microscopic Imaging of the Kidney with a Gradient-Index Lens System," Optics communications, 2008, vol. 281, No. 7, pp. 1833-1840.

Lipson et al., "CAREER: Overcoming the Limitations of Microelectronics Using Si Nanophotonics: Solving the Coupling, Modulation and Switching Challenges," NSF Award#: Mar. 1, 2015, 0446571.

Lipson et al., "Confining Light in the NM Scale," NSF Award#: Aug. 15, 2006, 0601460.

Messerschmidt et al., "Gradient index optical systems for endoscope applications and beam shaping of laser diodes," Diffractive Optics and Micro-Optics, vol. 41 of OSA Trends in Optics and Photonics (Optical Society of America, 2000), paper DThB4, Jun. 2000.

Messerschmidt, "Gradient index optical microsystems visualize living cells in deep tissue," Biophotonics International, Biophotonics International, 2007, pp. 36-38.

Park et al., "Optical waveguide integrated with a coupling prism and microlenses," 18th International Conference on Miniaturized Systems for Chemistry and Life Sciences, MicroTAS, Oct. 2014, pp. 2280-2282.

Seibel et al., "Microfabricated optical fiber with microlens that produces large field-of-view, video rate, optical beam scanning for microendoscopy applications," Proceedings of SPIE, Jan. 2003, vol. 4957, pp. 46-55.

Xu et al., "Miniaturized Two-Dimensional Optical Scanner Based on Planar Waveguide and Flexible Printed Circuit Beam Deflectors," IEEE Photonics Journal, Aug. 2017, vol. 9, Issue 4, pp. 1-11.

Zang et al., "Single-mode waveguide microlenses and microlens arrays fabrication in LiNbO3 using titanium," Applied Physics Letters, May 1985, vol. 46, Issue 8, pp. 703-705.

* cited by examiner

MICROMACHINED WAVEGUIDE AND METHODS OF MAKING AND USING

CROSS-REFERENCE TO RELATED APPLICATIONS

This application is the National Stage Application of International Patent Application No. PCT/US2019/032218, filed May 14, 2019, which claims priority to and the benefit of U.S. Provisional Patent Application Ser. No. 62/670,983 (filed May 14, 2018), the entirety of each application is hereby incorporated herein by reference for any and all purposes.

GOVERNMENT RIGHTS

This invention was made with government support under Grant No. 1611090 awarded by the National Science Foundation. The government has certain rights in the invention.

TECHNICAL FIELD

The invention relates to optical apparatuses and more particularly to a micro-machined waveguide.

BACKGROUND

At present, one method for imaging via fibers (which is a requirement for applications requiring remote imaging, e.g., endoscopy and testing in mass manufacturing) is so-called Fiber Graded index lenses (GRIN). These lenses, however, can exhibit comparatively poor resolution and very large size, and can also be limited to very specific shapes.

Besides GRIN lenses, optical fiber bundles can also be used for this type of imaging. The fiber bundles, however, can suffer from a lack of resolution (due to core size) and also exhibit unfavorable collection efficiency.

GRIN lens technology poses some additional difficulties. First, the lensing effect in the GRIN lenses comes from the variation of the refractive index of the material along the radius. This refractive index variation is based on the change of the dopant in the GRIN lens material. Accordingly, it can be difficult to induce a very large gradient index over the small area.

As a result, to have good imaging power, GRIN lenses are usually very large, and can be on the order of 1 millimeter in diameter. The size of such lenses are not ideal, and can this size can cause damage to the tissue. Moreover, because GRIN lenses have a relatively low index contrast, their field of view relies on drawing towers, and therefore any change in design requires significant investment. Accordingly, there is a need for improved imaging techniques and devices.

SUMMARY

Optical apparatuses and methods of making and using the same are disclosed. An optical apparatus can comprise a waveguide and a plurality of optical components, embedded within the waveguide or fabricated on the waveguide and configured to direct light rays through at least a portion of the waveguide. The light rays can represent at least a portion of an image. The plurality of optical components can be configured to preserve a wave front of the represented image such that the image can be reconstructed from the light rays on an image plane.

As described herein, a polymeric waveguide and the micro-lenses can be used for imaging. Because of the high refractive index, the lithographically defined lenses have a very high Numerical Aperture, therefore, its resolution is very high. The field of view relative to the actual size of the waveguide is very large, as illustrated in the ultra-high resolution imaging included in the Figures, which are only limited by the size of the waveguide (e.g., <0.8 micron resolution) and large field of view. A waveguide can have a cross-sectional dimension (e.g., width, thickness) of less than about 1 mm.

The field of view in the single lens and waveguide probe is dependent on the focal distance (f) and length of the probe (l). The microlens collimates the light from each point source located at the focal plane of the microlens in different angle and couple it to the waveguide.

In various embodiments, to construct an image of a specific point source, at least part of the collimated beam is collected by the objective lens before it changes its angle by hitting the waveguide wall. In other embodiments, to increase the length of the probe, multiple lenses can be used to redirect the beams before hitting the wall of the waveguide. Such methods and constructions can also help control aberrations in the image, thereby resulting in a sharper image.

The lens (or other optical component) polymer can be replaced with the polymers with different refractive index. In various embodiments, polymers can have different indices, for example, from 1.3 to 1.7. A negative lens can be made using different lens material. In other embodiments, discrete lenses with differing profiles can make a lens mold to make an integrated lens with exactly same profile. An inkjet printing method can also be used to develop the lens on top of each of the waveguide. Both chromatic and monochromatic aberrations can be corrected using different shapes and materials with different refractive index.

The scope of the invention also includes a system including a processor that executes stored instructions for executing the steps of the method. The above and other characteristic features of the invention will be apparent from the following detailed description of the invention.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

The above and other objects and advantages of the invention will be apparent to those skilled in the art based on the following detailed description in conjunction with the appended figures, of which.

DETAILED DESCRIPTION OF ILLUSTRATIVE EMBODIMENTS

Figure 1:
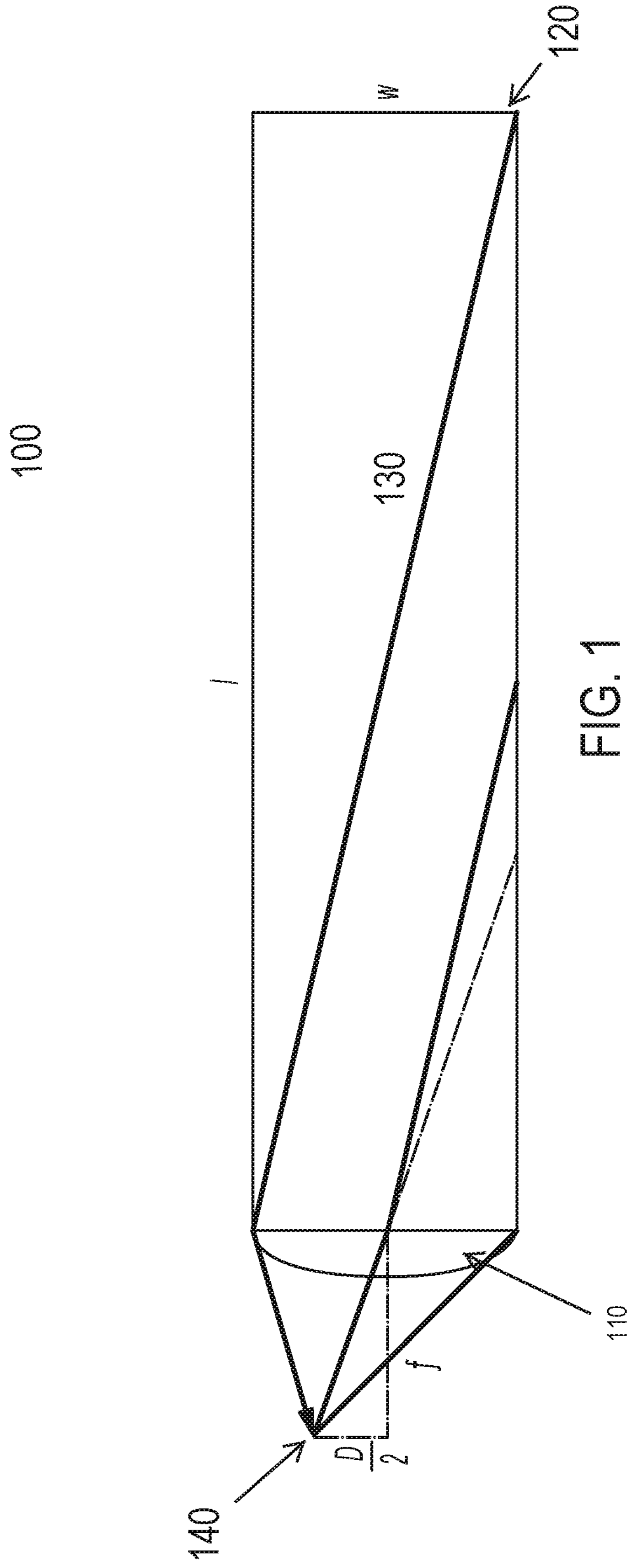
FIG. 1 illustrates a schematic representation of an optical apparatus overlaid with geometric optics calculation.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Exemplary embodiments of a fabrication process for creating waveguide probes is described below with respect to non-limiting FIGS. 1-12. Those skilled in the art will appreciate that the steps described are for exemplary purposes only and are not limited to the specific processes and embodiments described. Moreover, certain well-known details are not set forth in the following disclosure to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Non-limiting FIG. 1 depicts a waveguide probe structure 100, in which a single lens 110 alters the direction and spread of light beams 130 emitted from a point source 140. The field of view in the single lens 110 and waveguide probe is dependent on the focal distance (f) and length of the probe (l). Accordingly, using a simple geometrical optic calculation for the perfect lens in front of the waveguide, the relation between the focal distance (f), length (l), field of view diameter (D), waveguide width (w), and waveguide refractive index (n) is D/W=2nf/l.

The single lens 110, which can be a micro-lens, collimates the light 130 from each point source located at the focal plane of the micro-lens in different angle and couples it to the waveguide 110. In order to construct an image emitted from the specific point source, at least part of the collimated beam needs to be collected by an objective lens before it changes its angle after hitting the waveguide wall 120.

Figure 2:
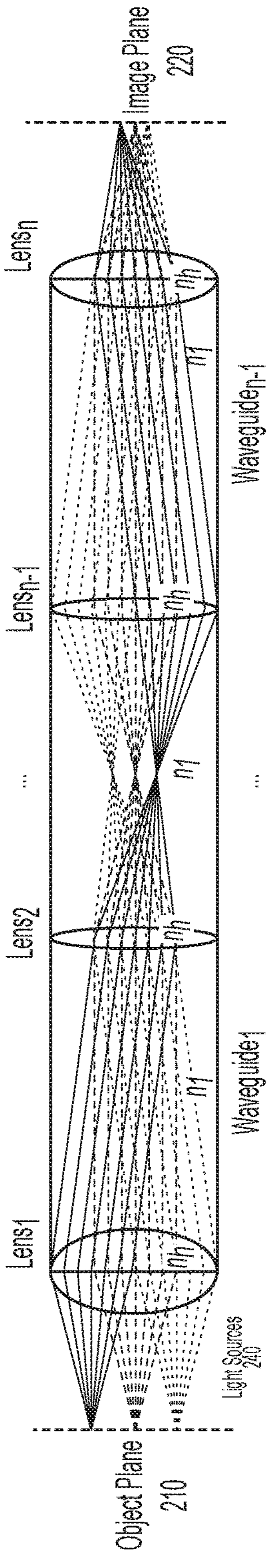
FIG. 2 illustrates a schematic representation of an optical apparatus having n-lenses in accordance with an aspect of the present disclosure.

In some embodiments, multiple lenses within a probe can be used to increase the length of the probe and redirect the beams before hitting the wall of the waveguide. Non-limiting FIG. 2 illustrates a waveguide probe transmitting light beams from an object plane 210 through multiple lenses to an image plane 220.

In one example, a plurality of lenses ($Lens_1$, $Lens_2$, . . . , $Lens_n$) transmit the image across length of the waveguide. A first lens ($Lens_1$) receives light beams from a plurality of light sources 240 and converges the beam spread towards a second lens, which alters the angle of the beam spread (e.g., converge or diverge) such that the light beams do not hit the wave guide wall. The beam spread is controlled and passes through n-lenses before a final lens ($Lens_n$), which projects the beam spread onto the image plane 220. The beam spread can be controlled, as discussed above with respect to non-limiting FIG. 1, by considering one or more factors, such as the focal distance of each lens, the length between lenses, field of view diameter, waveguide width, and waveguide refractive index. Thus, by adding more lenses, each selected based on desired length and beam spread considerations, the waveguide probe length can be increased to virtually any desired length.

In contrast to conventional systems, e.g., GRIN lenses, where controlling aberrations is a challenge, the specific design and placement of each lens in the light path help control the aberrations to achieve the desired image. In some embodiments, additional surfaces in design of the lenses can be used to provide further control of the aberrations. Therefore, unlike GRIN lenses, which act as cascade of one type of lens, the disclosed embodiments can control and correct aberrations in the light path, while also enabling an increase in the length of the probe.

Figure 3A:
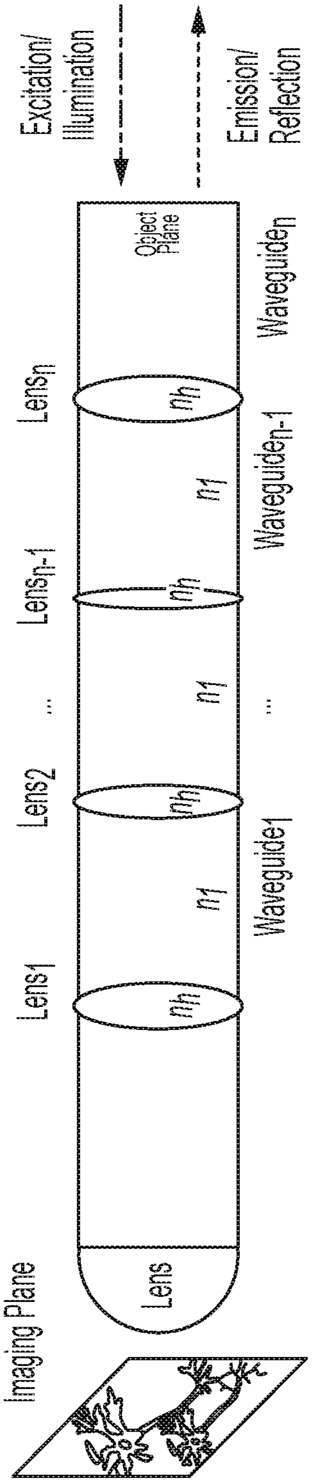
FIG. 3A illustrates a schematic representation of an optical apparatus in accordance with an aspect of the present disclosure.
Figure 3B:
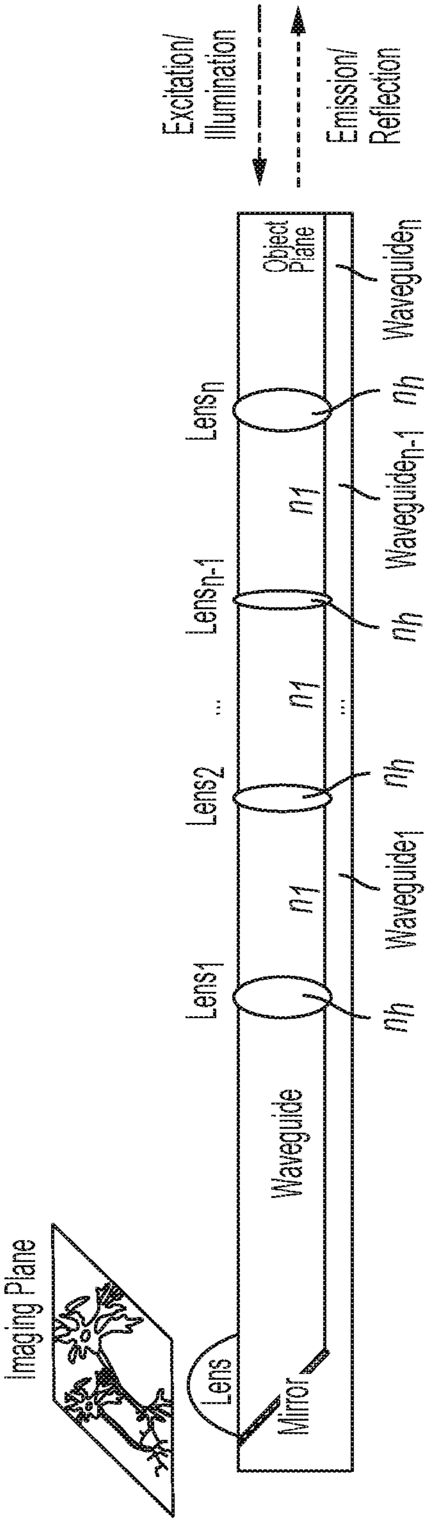
FIG. 3B illustrates a schematic representation of an optical apparatus in accordance with an aspect of the present disclosure.

FIGS. 3A-B illustrate schematic representations of waveguide probes in accordance with an aspect of the present disclosure. In the embodiments, multiple lenses with variety of refractive indices and shapes guide the light through the waveguide and preserve the wave front for display on an imaging plane. As illustrated, in one embodiment a point source provides excitation/illumination into the lens-guide through an object plane. The light can then be transferred through the lens-guide through a plurality of lenses to reconstruct the image at the imaging plane. Any of a plurality of configurations of stacks of lenses can be applied in the lens-guide system to achieve different imaging properties. In embodiments, the lens-guide can comprise at least one mirror to alter a direction, size, or other characteristic of the light beam during its path along the lens-guide towards the imaging plane. Light can be reflected back from the imaging plane through the wave guide, and emitted/reflected back through the object plane.

In example embodiments, object conjugates can be created inside or outside of the probe and different imaging combinations outside of the probe (in free space, for example) can be applied to reconstruct the final image. The lens-guide system can be applied to any type of imaging system, including single or multiphoton fluorescence imaging, optical coherence tomography (OCT), endoscopy or replacement applications which need beam shaping, or as a replacement for Graded Index (GRIN) Lenses.

In one example embodiment, the lenses can also be applied to a side or at the tip of a probe to make the probe either side looking or forward looking.

In other embodiments, aberrations are corrected using one or more of a plurality of aberration correction methods including, but not limited to, a modification of the lens shape or using different material with different refractive indices.

In addition, the optical apparatuses of any of FIGS. 1-3 can be used to cause an increase of the imaging area in comparison with the tissue removal. Moreover, the first and last lenses of the optical apparatuses (e.g., $Lens_1$ and $Lens_n$) can be covered with low index material, similar to one or more embodiments described with regard to FIGS. 6A and 6B. For example, the lensguide can be fully embedded within a material having a lower refractive index. Any lens or other optical component of the optical apparatus can comprise a low index material therein or thereon.

Figure 4A:
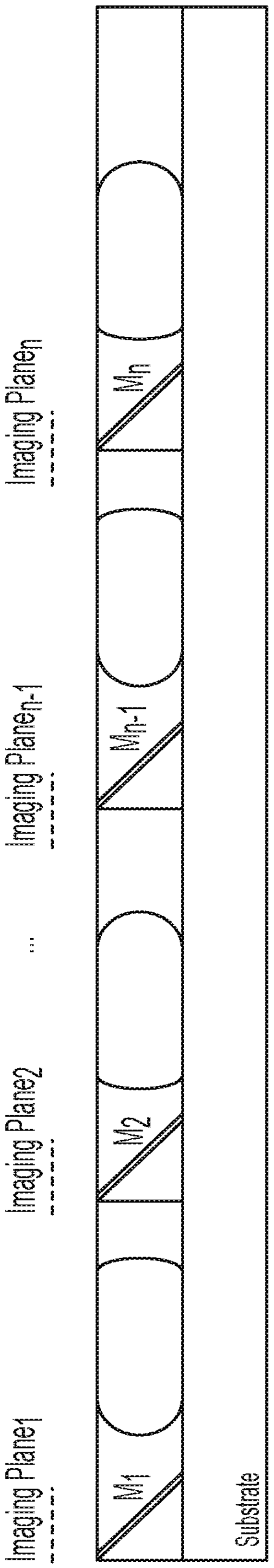
FIG. 4A illustrates a schematic representation of an optical apparatus comprising mirrors and filters in accordance with an aspect of the present disclosure.
Figure 4B:
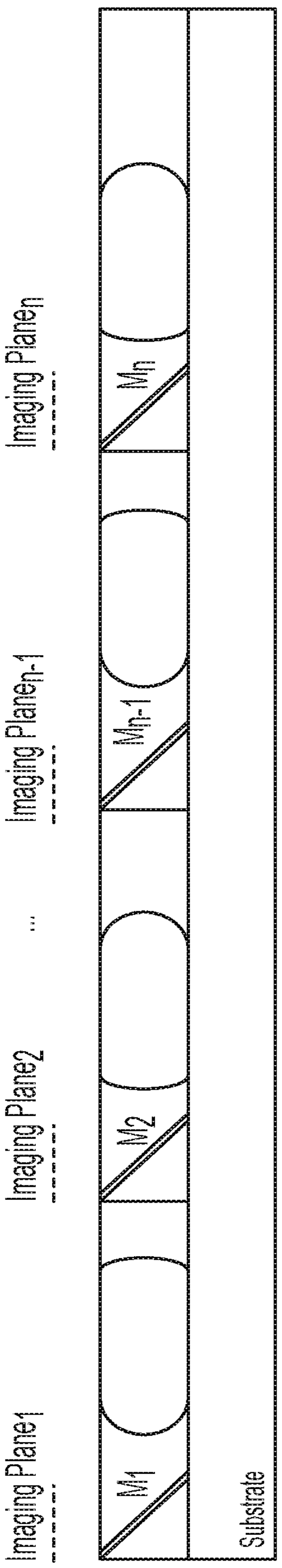
FIG. 4B illustrates a schematic representation of an optical system including an optical apparatus comprising mirrors and filters in accordance with an aspect of the present disclosure.

In reference to FIGS. 4A-B, various embodiments of the optical apparatuses disclosed herein can comprise one or more side looking probes and lenses along the waveguide. A plurality of lenses, filters, and mirrors ($M_1, M_2, \ldots, M_n$) can be mounted on a substrate (e.g., directly on the substrate) in a plurality of configurations, e.g., forward-looking and side-looking, to result in multiple imaging planes.

As illustrated in non-limiting FIGS. 4A-B, a cascade of micro-lenses and corresponding mirrors inclined 45° with respect to the integrated waveguide are configured so as to deflect incident light by approximately 90° into a corresponding micro-lens. Replacing mirrors by the filters and utilizing wavelength dividing/multiplexing techniques in this case can significantly decrease the background noise and increase the contrast.

In some embodiments, side looking probes can comprise mirrors (e.g., partially-reflective) and filters (reflecting light at certain wavelengths and allowing light to pass through at other wavelengths) or any combination thereof. A plurality light beams entering through an object plane can therefore travel along a length of the waveguide through one or more probes and/or lenses such that images are formed on one or more imaging planes. The types of lenses and probes can be altered, as disclosed herein, depending on the waveguide length, diameter, positioning of the imaging plane, and desired output.

In various examples, embodiments can have (but also do not require) lenses on the side, and the mirrors and filters can individually be diffractive, refractive, or comprised of metamaterials.

In other embodiments, to view the side of the probe at a different depth, the objective/lens before the camera (which can be positioned outside of the probe) can move to change the focus on different imaging planes, and therefore image different planes on the side of the probe.

Figure 5A:
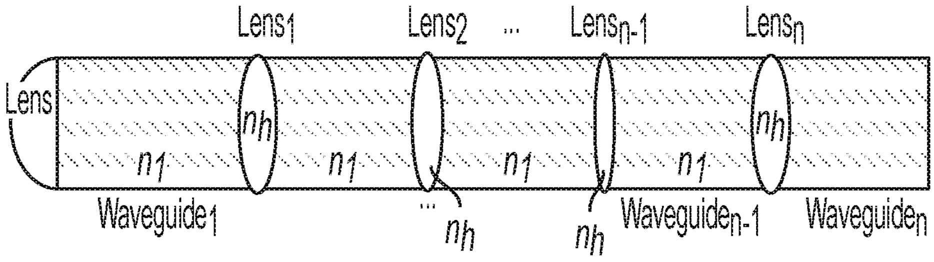
FIG. 5A illustrates a schematic representation of an optical apparatus comprising a plurality of lenses in accordance with an aspect of the present disclosure.
Figure 5B:
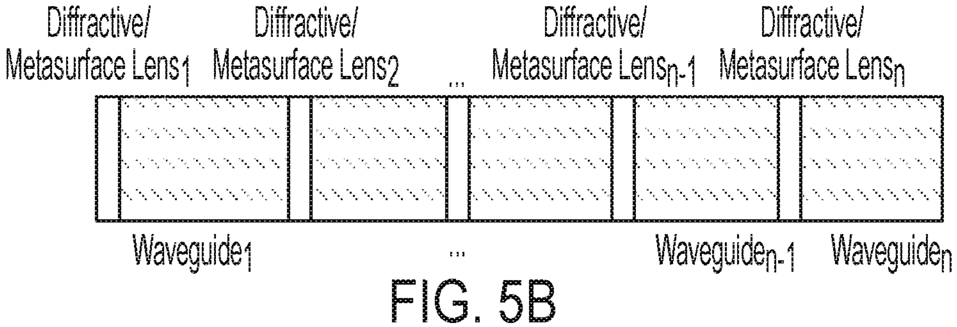
FIG. 5B illustrates a schematic representation of an optical apparatus comprising a plurality of lenses in accordance with an aspect of the present disclosure.
Figure 5C:
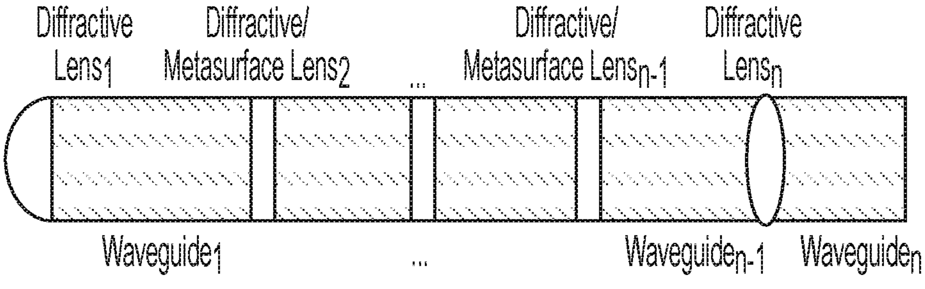
FIG. 5C illustrates a schematic representation of an optical apparatus comprising a plurality of types of lenses in accordance with an aspect of the present disclosure.

Non-limiting FIGS. 5A-C illustrate various embodiments utilizing different types and combinations of lenses and waveguides. For example, lensguides can comprise combinations of one or more refractive, diffractive and metasurface lenses disposed in the series. The distance between the lenses and type of the optical components can also be modified, for example, based on the imaging properties and aberration correction. A distance between a lens and an optical component can be fixed, but can also be adjustable.

Non-limiting FIG. 5A illustrates a lensguide comprising a plurality of lenses varying in size and focal length. Such lenses can be refractive or diffractive, and can be made of a non-metasurface material, though this is not a requirement. As discussed herein, the length, size, and distance between the lenses, among other characteristics, can be varied depending on the length of the waveguide, the position of object plane, the position of the imaging plane, and other components, e.g., optical components, aberration corrections, that can be included in the optical apparatus.

Non-limiting FIG. 5B illustrates an embodiment wherein a plurality of diffractive metasurface lenses are utilized. The types and sizes of each lens can be the same, and positioned at a same distance from one another, or vary in one or more characteristics, as discussed herein.

Non-limiting FIG. 5C illustrates an embodiment comprising a combination of metasurface and non-metasurface lenses, which can be diffractive lenses. Again, the size of each lens, the focal lengths of leach lens, distances between the lenses, and other characteristics can be modified depending on desired characteristics and outputs of the lensguide. It will also be appreciated that the combinations and variations of these lensguides are not limited to the depicted embodiments. Any of a plurality of combinations or lens types, sizes, and optical elements can be incorporated.

Figure 6A:
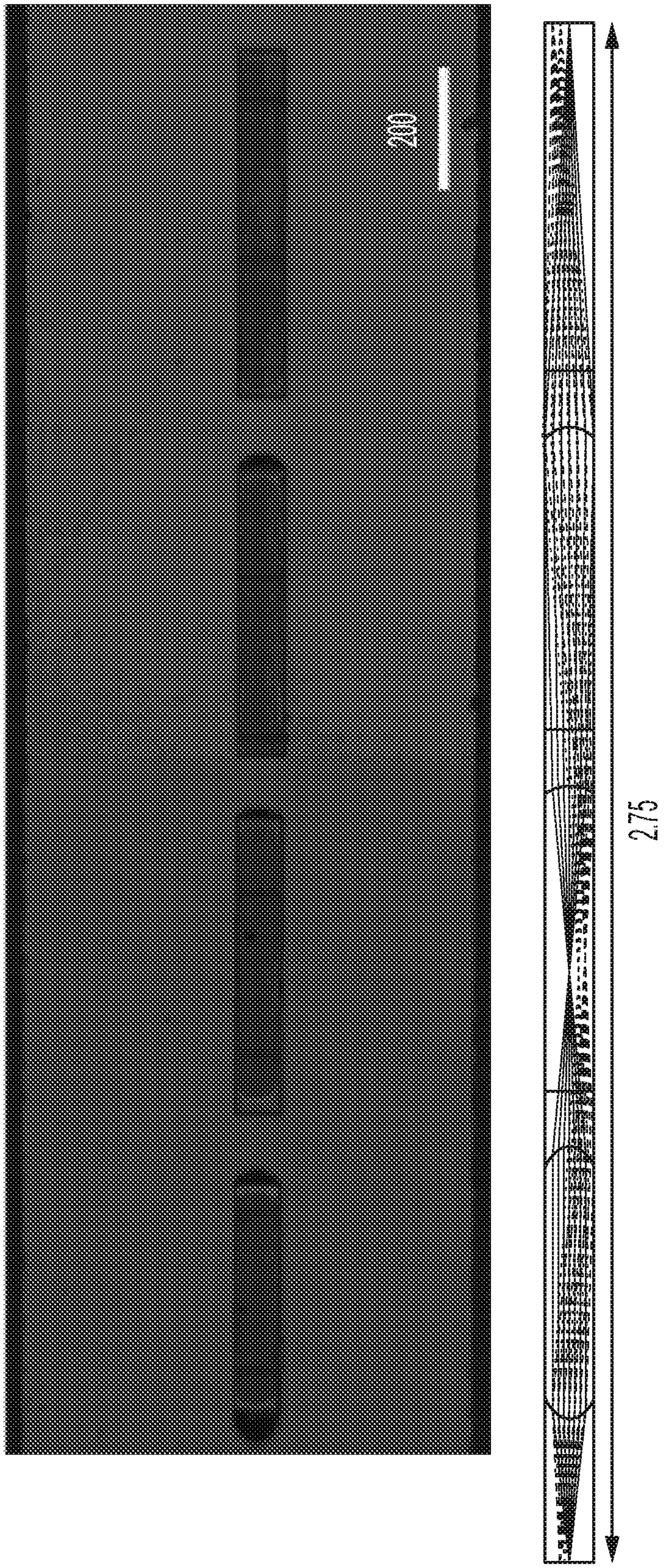
FIG. 6A illustrates an optical apparatus and the propagation of a beam inside the same optical apparatus, in accordance with an aspect of the present disclosure.
Figure 6B:
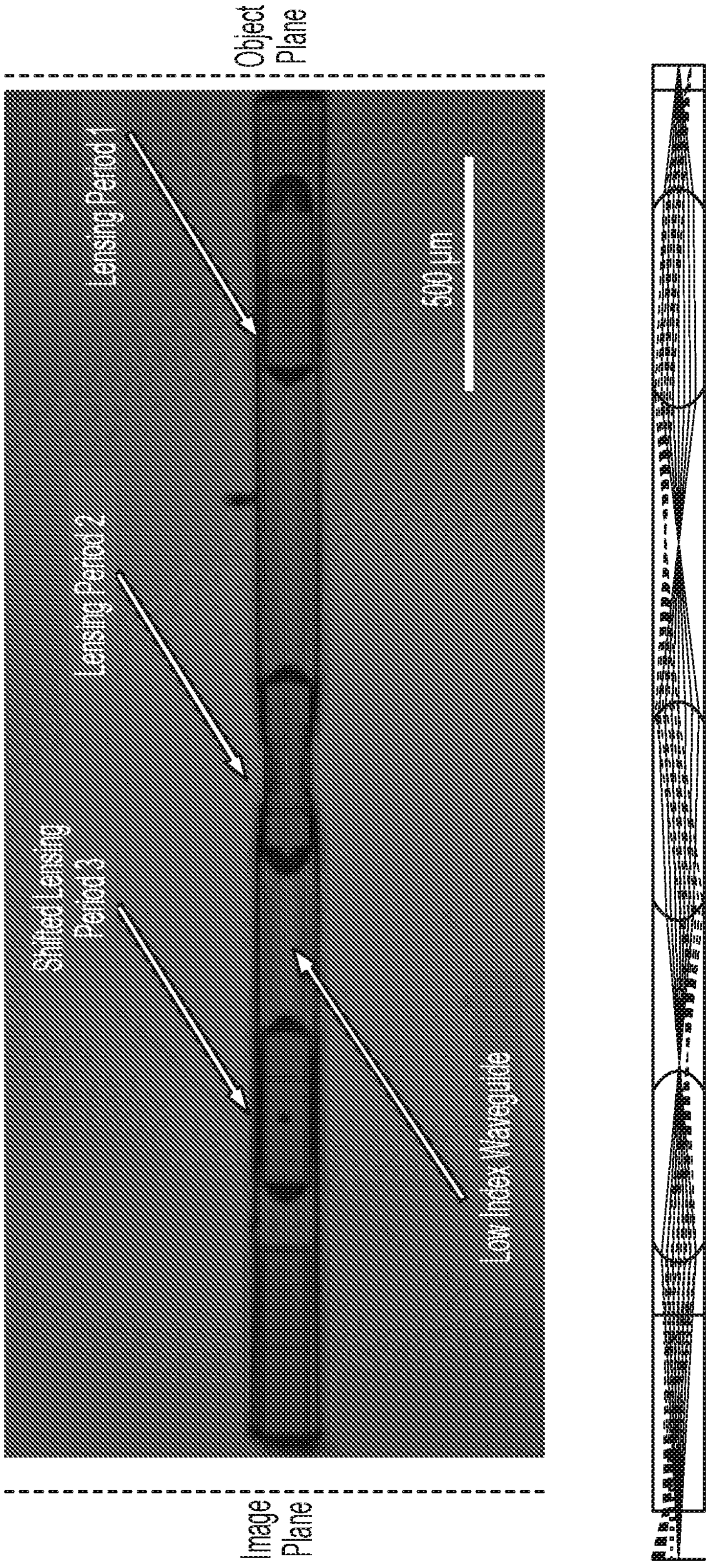
FIG. 6B illustrates an optical apparatus comprising a high refractive index and low refractive index polymer, and propagation of a beam inside the same optical apparatus, in accordance with an aspect of the present disclosure.

FIGS. 6A-B each illustrate a beam propagating within a lensguide, as well as the fabricated lensguide. FIG. 6A illustrates an example embodiment wherein a lensguide is fully embedded within a material having a lower refractive index. (Such full embedding is not a rule or requirement, as a lensguide can be partially embedded in a material having a lower refractive index.) FIG. 6B illustrates a lens guide using a high refractive index polymer, showing beam propagation in the same lensguide probe. In particular, FIG. 6B further illustrates that a combination of micro-lenses and waveguides with high and low refractive index polymers. In such embodiments, the profile of each surface can be optimized along the light path for different point sources located across the field of view. As shown, a component can include one or multiple lensing periods.

Figure 7:
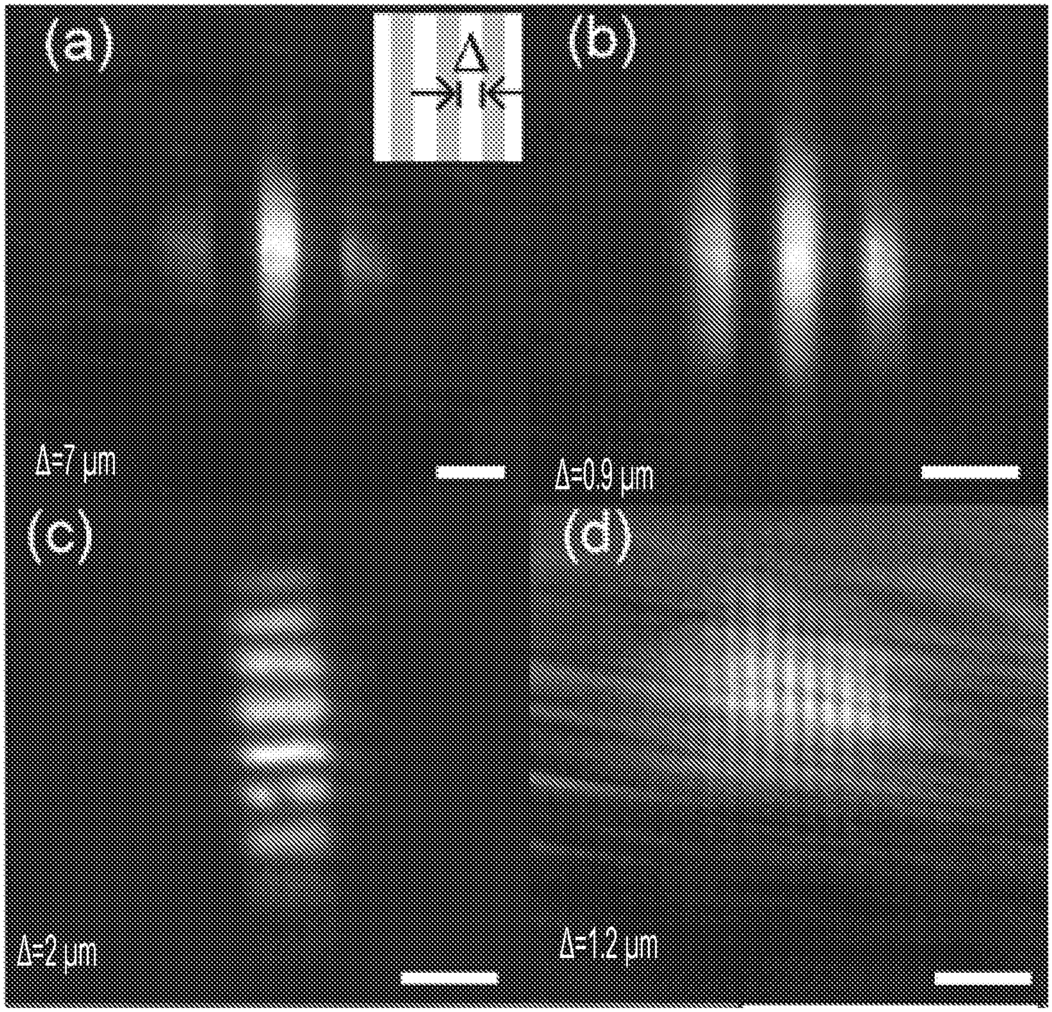
FIG. 7 shows the imaging of the image target through an optical apparatus, in accordance with an aspect of the present disclosure.

Non-limiting FIG. 7 illustrates and imaging of an image target through the lensguide at differing resolution targets. In the various examples, the illumination passes through the waveguide, and creates grid lines at various spacings, with A corresponding to the spacing between lines in micrometers, μm, with the scale bars 710 indicative of a spacing of 10 μm. Accordingly, (a) illustrates a schematic of the imaging target with Δ=7 μm; (b) illustrates a schematic of the imaging target with Δ=4.5 μm; (c) illustrates a schematic of the imaging target with Δ=2 μm; and (d) illustrates a schematic of the imaging target with Δ=1.2 μm through the lensguide.

Figure 8:
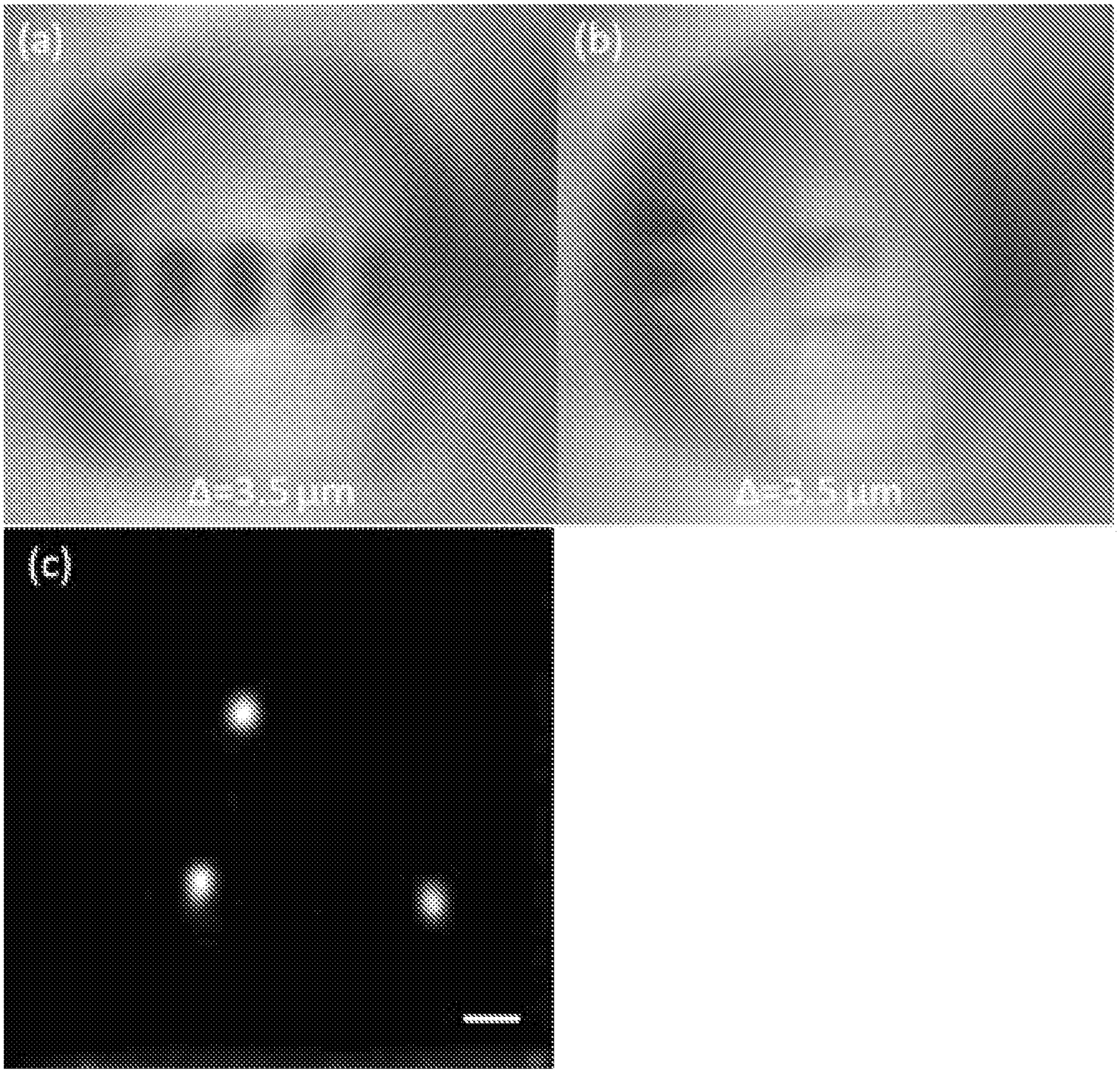
FIG. 8 shows the imaging of the imaging target through another type of the lensguide. The illumination has been done from the object side.

Non-limiting FIG. 8 illustrates another example of imaging of an image target through a different type of the lensguide. In the depicted, non-limiting example, the illumination has been done from the object side. Accordingly, the spacing for each target is Δ=3.5 μm.

Methods of Making

Figure 9:
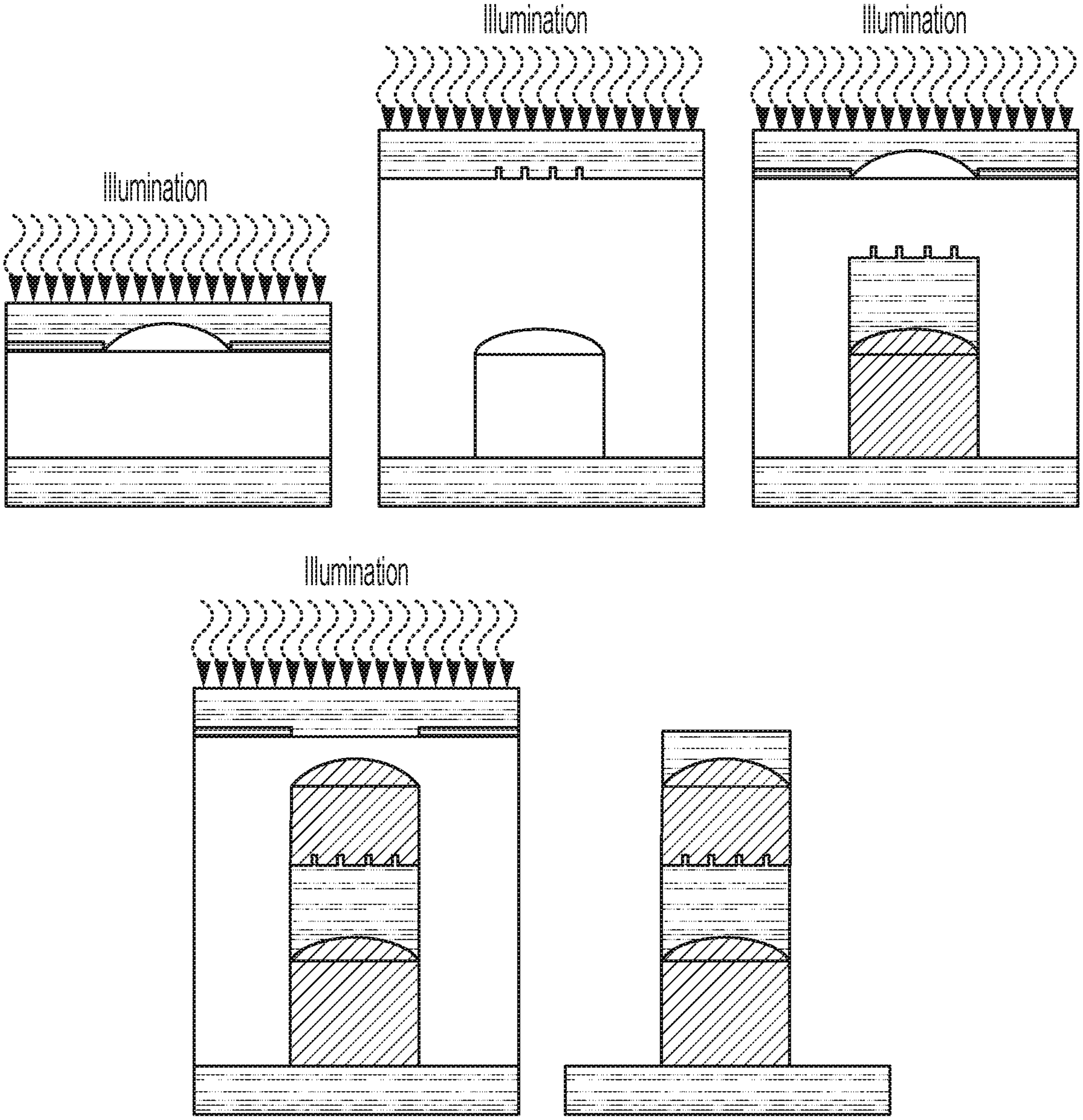
FIG. 9 illustrates a fabrication method in accordance with an aspect of the present disclosure.

By reference to non-limiting FIG. 9, fabrication of a waveguide probe can be accomplished through various methods, e.g., molding and photolithography. Various molds and/or masks can be made using, for example, etching, mold printing, and/or mold patterning. FIG. 9 illustrates this process, demonstrating the formation of each layer of the waveguide probe. In some embodiments, the lens and waveguide are comprised of the same polymeric material. This is not a requirement, however, as the lens and waveguide can comprise different polymeric materials with the same or different refractive indices.

In embodiments, during each step of the fabrication process, the mold can be covered by anti-sticking coating, and the pattern of the lens waveguide can be made on the mask. In embodiments, the mask/mold substrate can have a similar refractive index as the polymer which is filled in the middle of the layers to have a better lithography quality (despite any pattern on the mold). In each fabrication step the distance between the substrate and the mold can be determined, and the gap between layers will be filled with the photosensitive polymer. The photosensitive polymer can be, for example, a negative photo resist. Subsequently, the mask/mold is exposed from the top and the area of interest would be polymerized, thus forming that portion of the waveguide probe.

Figure 10:
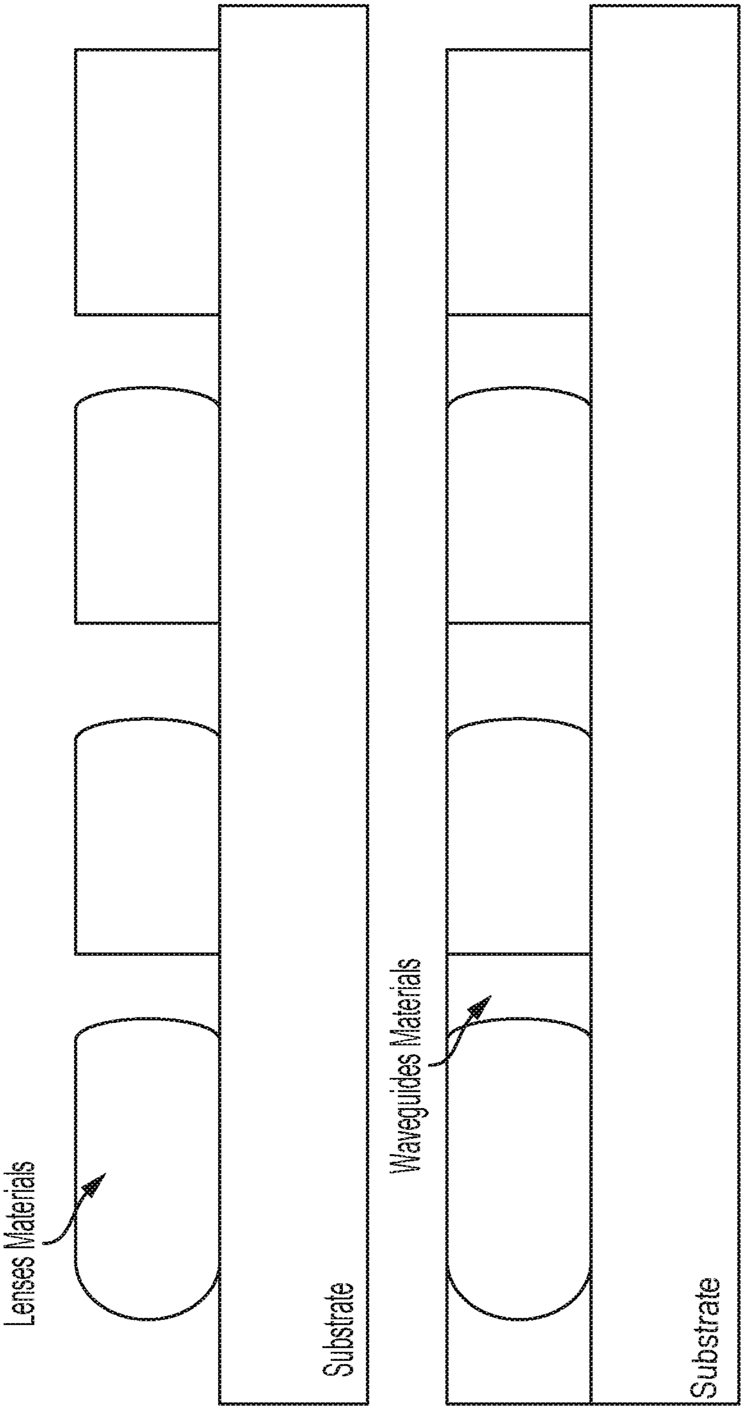
FIG. 10 illustrates a fabrication method in accordance with an aspect of the present disclosure.

Non-limiting FIG. 10 illustrates another fabrication method, which method is based on regular lithography and additive manufacturing (e.g., 2 photon polymerization). In this method, lens materials are formed on a substrate, and the waveguide materials (e.g., polymeric materials) can fill in the spacing between the lens materials. Lenses can have a variety of refractive indices and shapes. Varied shapes and refractive indices can be used for chromatic and different types of monochromatic aberration and at the same time increasing the length of the probe without scarifying the image quality.

Figure 11:
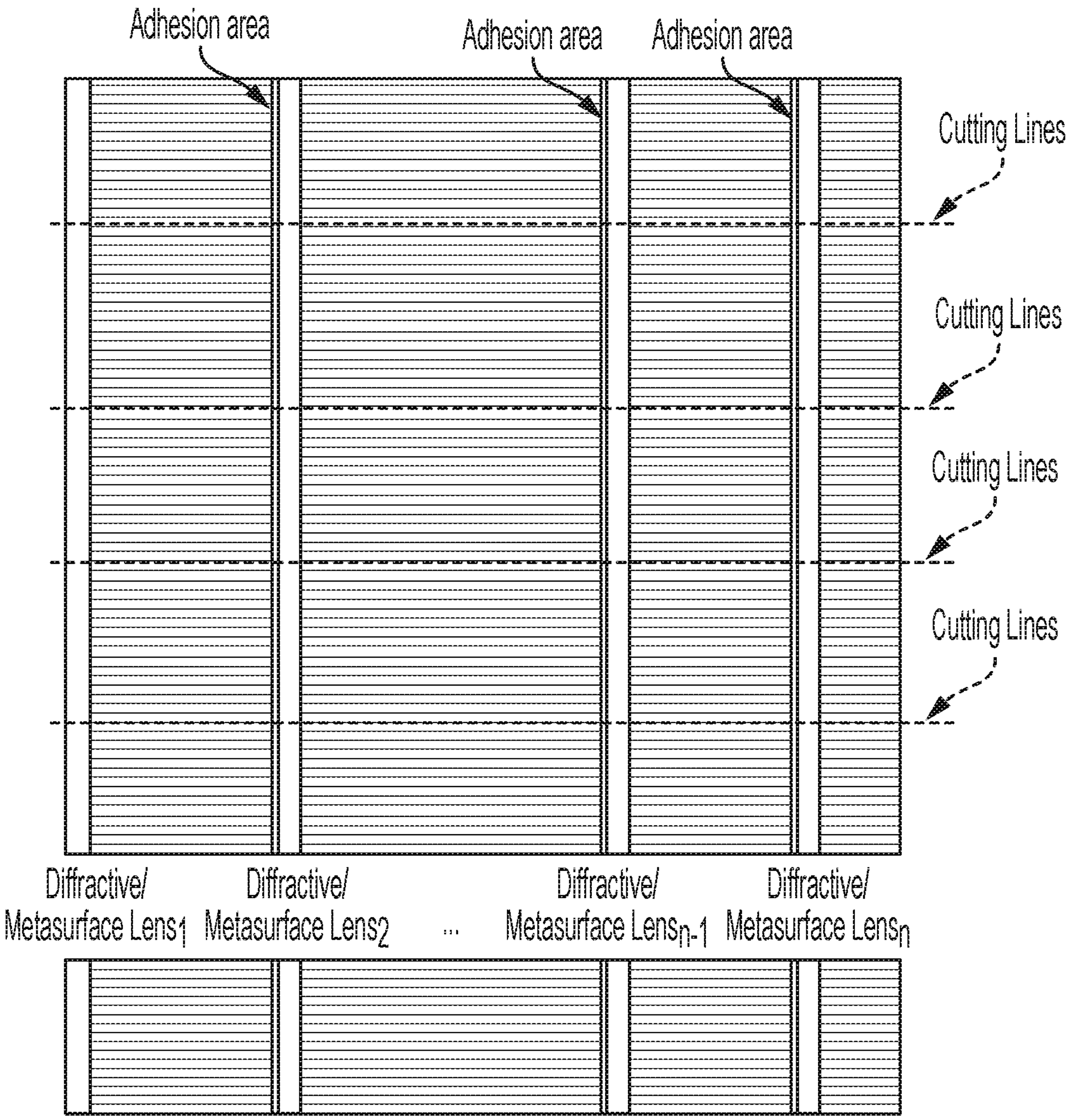
FIG. 11 illustrates a fabrication method in accordance with an aspect of the present disclosure.

FIG. 11 illustrates yet another illustrative, non-limiting fabrication method. In the depicted example, the probe can be formed through stacking of different diffractive/metasurface flat lenses. A layer can be attached to one or more other layers using different adhesives and other bonding mechanisms, for example. After the stack of lenses is complete, they can be diced and/or cut, e.g., along cutting lines (such as the depicted cutting lines) at the end to form individual waveguide probes. As shown, different lenses and different layers can be formed of different (or the same) materials.

Methods of Using

Figure 12:
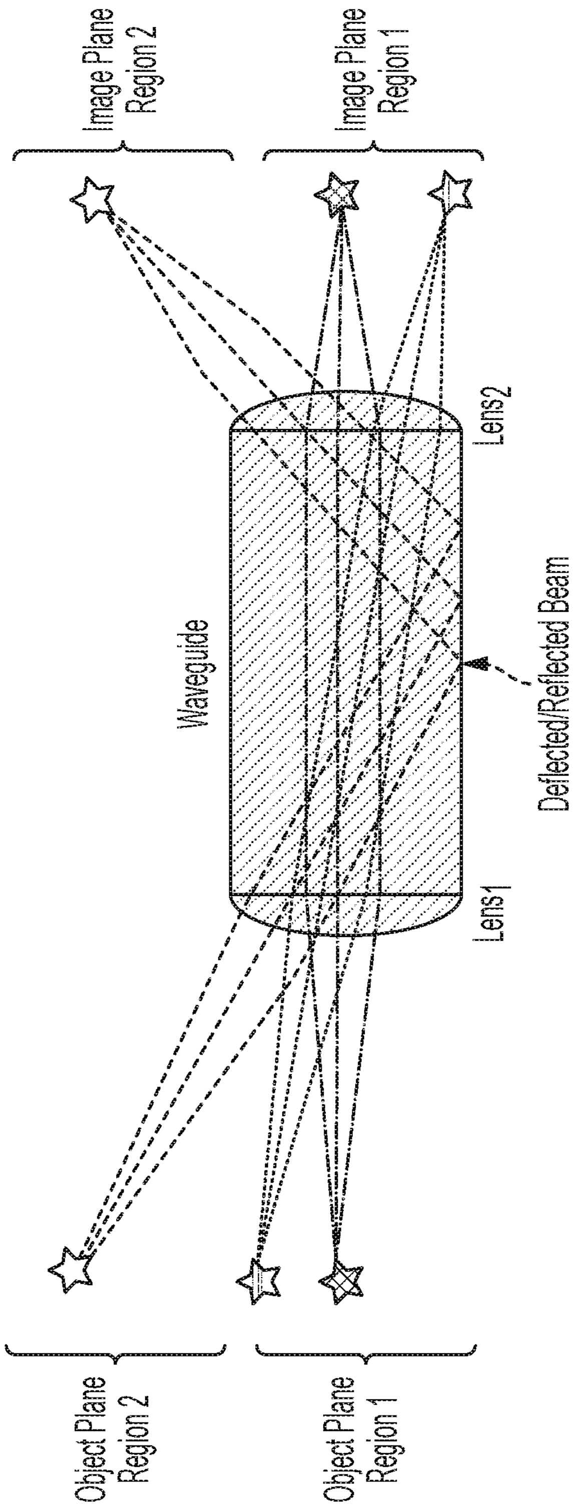
FIG. 12 illustrates a schematic of an optical apparatus in accordance with the present disclosure.

In various embodiments, the waveguide field of view can be increased using a guiding mode or reflection mode of the waveguide. FIG. 12 illustrates an example a beams being reflected from the surface of a waveguide and imaged at separate regions. In the example, the object plane comprises two regions, which can be located substantially close to each other or at a distance. Beams from each region are directed into Lens 1, which directs the beams through the waveguide in accordance with one or more embodiments disclosed herein.

As one example, beams can be deflected and reflected at one or more points along the waveguide. A waveguide can comprise additional lenses and/or optical components to control the beam spread and direction towards Lens 2. The beams ultimately pass through Lens 2 to the image plane. In embodiments, the image plane can comprise a plurality of regions. Accordingly, the light beams can be directed towards one or more regions of the imaging plane. Similar to the object plane discussed herein, the image plane regions can be located at a same or different locations.

Through various configurations and designs of optical apparatuses, object planes, imaging planes, light sources, and optical elements (e.g., lenses, filters, mirrors, etc.), the various possible reflection paths result in a significant increase in the effective imaging area of the waveguide. Accordingly, this increases the potential applications and methods of use for waveguide probes and optical apparatuses. A similar increase in effective imaging area can also be realized using a guiding mode of the waveguide.

In various embodiments, the object plane can comprise two regions, which output reverse images of each other. The efficiency of each region can depend on the reflectivity of the waveguide walls and lens efficiency for that region.

EMBODIMENTS

Additional examples of the present disclosure are set forth below.

Embodiment 1. An optical apparatus comprising: a waveguide; and a plurality of optical components disposed in the waveguide and configured to direct light rays (e.g., traveling light rays) through at least a portion of the waveguide, wherein the light rays represent at least a portion of an image, and wherein the plurality of optical components are configured to preserve a wave front of the represented image such that the image can be reconstructed from the light rays on an image plane.

Embodiment 2. The optical apparatus of Embodiment 1, wherein the waveguide is formed from a polymeric material.

Embodiment 3. The optical apparatus of any of Embodiments 1-2, wherein the plurality of optical components comprises one or more lenses.

Embodiment 4. The optical apparatus of any of Embodiments 1-3, wherein the plurality of optical components comprises one or more mirrors.

Embodiment 5. The optical apparatus of any of Embodiments 1-4, wherein the plurality of optical components comprises one or more optical filters.

Embodiment 6. The optical apparatus of Embodiment 1, wherein the plurality of optical components comprises at least two different optical components.

Embodiment 7. The optical apparatus of any of Embodiments 1-6, wherein the plurality of optical components comprises a refractive component, a diffractive component, a metasurface component, or a combination thereof.

Embodiment 8. The optical apparatus of any of Embodiments 1-7, wherein at least some of the plurality of optical components are configured in series relative to the travelling light rays.

Embodiment 9. The optical apparatus of any of Embodiments 1-8, wherein one or more types of the optical components is selected to correct aberration of the image.

Embodiment 10. The optical apparatus of any of Embodiments 1-9, wherein a spacing of two or more of the plurality of optical components is selected to correct aberration of the image.

Embodiment 11. A method of using the optical apparatus of any one of Embodiments 1-10. Such methods can include, e.g., transmitting one or more light rays through at least some of the plurality of optical components disposed in the waveguide.

Embodiment 12. The method of Embodiment 10, wherein the method comprises single or multiphoton fluorescence imaging, optical coherence tomography (OCT), endoscopy, microscopic imaging, in situ drug delivery monitoring, or as a replacement for Graded Index (GRIN) Lenses in an application.

Embodiment 13. The method of Embodiment 10, wherein the method comprises internal inspection of hardware, surveillance, examination of explosive devices, or microscopy, e.g., for identifying fraudulent artwork.

Embodiment 14. A method of making the optical apparatus of any one of Embodiments 1-10. Such methods can include, e.g., assembling the described components in the described arrangement.

Embodiment 15. The method of Embodiment 14, wherein the method comprises molding, photolithography, or any combination thereof.

Embodiment 16. The method of Embodiment 14, wherein the method comprises lithography.

Embodiment 17. The method of Embodiment 14, wherein the method comprises additive manufacturing. The waveguide can be formed via additive manufacturing; an optical component (e.g., a lens, a splitter, a mirror) can also be formed via additive manufacturing.

Embodiment 18. The method of Embodiment 14, wherein the method comprises stacking materials along a first direction and cutting the stack along the first direction.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

What is claimed:

1. An optical apparatus, comprising:

a waveguide comprising a waveguide material, the waveguide having (i) a plurality of optical components embedded within the waveguide material, and (ii) a section of the waveguide material disposed between and contacting a first optical component and a second optical component of the plurality of components, the waveguide configured to receive light rays at an end of the waveguide and internally redirect the light rays through at least one optical component of the plurality of optical components, wherein the light rays define a lensing period within the waveguide material section, wherein the light rays represent at least a portion of an image, and wherein the plurality of optical components is configured to preserve a wave front of the represented image such that the image can be reconstructed on an imaging plane from the redirected light rays.

2. The optical apparatus of claim 1, wherein the waveguide is formed from a polymeric material.

3. The optical apparatus of claim 1, wherein the plurality of optical components comprises a lens.

4. The optical apparatus of claim 1, wherein the plurality of optical components comprises a mirror.

5. The optical apparatus of claim 1, wherein the plurality of optical components comprises an optical filter.

6. The optical apparatus of claim 1, wherein the plurality of optical components comprises at least two different optical components.

7. The optical apparatus of claim 1, wherein a polymeric material forms at least one of a refractive lens, diffractive lens, and a metasurface lens.

8. The optical apparatus of claim 1, wherein the plurality of optical components are configured in series relative to the travelling light rays.

9. The optical apparatus of claim 1, wherein a type of optical components is selected to correct aberration of the image.

10. The optical apparatus of claim 1, wherein a spacing of two or more of the plurality of optical components is selected to correct aberration of the image.

11. A method of using an optical apparatus, the method comprising:

receiving, at an end of a waveguide comprising a waveguide material, light rays representing at least a portion of an image, the waveguide having (i) a plurality of optical components embedded within the waveguide material, and (ii) a section of the waveguide material disposed between and contacting a first optical component and a second optical component of the plurality of components;

internally redirecting the light rays through at least one optical component of the plurality of optical components, wherein the light rays define a lensing period within the waveguide material section; and preserving, by the plurality of optical components, a wave front of the represented image such that the image can be reconstructed on an imaging plane from the redirected light rays.

12. The method of claim 11, wherein using the optical apparatus comprises performing one or more of single or multiphoton fluorescence imaging, optical coherence tomography (OCT), endoscopy, microscopic imaging, in situ drug delivery monitoring, or replacement of Graded Index (GRIN) Lenses in an application.

13. The method of claim 11, wherein using the optical apparatus comprises performing one or more of internal inspection of hardware, surveillance, examination of explosive devices, or microscopy for identifying fraudulent artwork.

14. A method of making an optical apparatus, the method comprising:

forming a waveguide comprising a waveguide material, the waveguide having (i) a plurality of optical components embedded within the waveguide material, and (ii) a section of the waveguide material disposed between and contacting a first optical component and a second optical component of the plurality of components, the waveguide configured to receive light rays at an end of the waveguide and internally redirect the light rays through at least one optical component of the plurality of optical components, wherein the light rays define a lensing period within the waveguide material section, wherein the light rays represent at least a portion of an image, and wherein the plurality of optical components is configured to preserve a wave front of the represented image such that the image can be reconstructed on an imaging plane from the redirected light rays.

15. The method of claim 14, wherein making the optical apparatus comprises molding and photolithography.

16. The method of claim 14, wherein making the optical apparatus comprises lithography.

17. The method of claim 14, wherein making the optical apparatus comprises additive manufacturing.

18. The method of claim 14, wherein making the optical apparatus comprises stacking materials along a first direction and cutting the stack along the first direction.

19. The method of claim 14, wherein a polymeric material forms at least one of a refractive lens, diffractive lens, and a metasurface lens.

20. The method of claim 14, wherein the optical component is a lens.

21. The method of claim 14, wherein the first optical component defines a first lensing period and the second optical component defines a second lensing period.

22. The method of claim 14, wherein the first optical component has at least one of a size and a focal length that is different from the second optical component.

23. The method of claim 14, wherein the plurality of optical components are embedded in a material having a lower refractive index.

24. The method of claim 14, wherein the waveguide further comprises at least one of a section of a liquid waveguide material and a section of a solid waveguide material.

* * * * *